United States Patent [19]

Honda

[11] Patent Number: 4,893,045
[45] Date of Patent: Jan. 9, 1990

[54] ULTRASONIC DRIVING DEVICE

[75] Inventor: Keisuke Honda, Aichi, Japan

[73] Assignee: Honda Electronic Co., Ltd., Aichi, Japan

[21] Appl. No.: 218,656

[22] Filed: Jul. 13, 1988

[30] Foreign Application Priority Data

Jul. 14, 1987 [JP] Japan .............................. 62-176911
Sep. 12, 1987 [JP] Japan .............................. 62-228799

[51] Int. Cl.⁴ ........................................... H01L 41/08
[52] U.S. Cl. ................................... 310/323; 310/333; 310/366; 310/325; 310/365
[58] Field of Search ............... 310/323, 328, 365, 366, 310/333, 369, 325

[56] References Cited

U.S. PATENT DOCUMENTS

| | | | |
|---|---|---|---|
| 4,634,916 | 1/1987 | Okada et al. | 310/323 |
| 4,728,843 | 3/1988 | Mishiro | 310/323 X |
| 4,752,711 | 6/1988 | Tsukimoto et al. | 310/323 |

Primary Examiner—Mark O. Budd
Attorney, Agent, or Firm—Burgess, Ryan and Wayne

[57] ABSTRACT

A stator is composed by two metal blocks, a piezoelectric vibrator and vibrators, and two electrodes, in which one electrode is divided in two at least, the metal blocks, the piezoelectric vibrator or vibrators and two electrodes are fixed by means of a bolt or means of adhesive thing, and a member to be driven composed on the nut or the end or side portion of the stator.

24 Claims, 7 Drawing Sheets

PRIOR ART

FIG. I

PRIOR ART

FIG. 2

PRIOR ART

FIG. 3

PRIOR ART

ULTRASONIC DRIVING DEVICE

BACKGROUND OF THE INVENTION

The present invention relates to an ultrasonic driving device comprising a stator using a ring type piezoelectric vibrator or vibrators and metal blocks.

In a known ultrasonic motor using a piezoelectric vibrator, two groups of electrodes are attached to one side of a ring type piezoelectric ceramic, the two groups of electrodes are so positioned that standing waves respectively generated by the two groups of electrodes are shifted every $\pi/2$ in each position. The parts of the ring type piezoelectric vibrator corresponding to the electrode are alternately polarized in reverse. Also, the two groups of the electrodes are respectively connected to two oscillators for respectively generating alternating currents having $\pi/2$ phase shift each other. When the alternating currents from the two oscillators are respectively applied to the two groups of electrodes, the two standing waves having a $\pi/2$ phase shift to each other generated on the surfaces of the ring type piezoelectric vibrator and then progressive waves owing to a compound of the two standing waves generate on the surfaces of the ring type piezoelectric vibrator. Therefore, when a rotary member is put on the ring type piezoelectric vibrator and the rotary member is strongly pressed to the ring type piezoelectric vibrator, the rotary member is rotated by the progressive waves.

In the prior ultrasonic motor, since the ring type piezoelectric vibrator must be polarized in many portions thereof and the two oscillators must be connected to the electrodes, the composition of the ring type piezoelectric vibrator is complex and the cost of the ultrasonic motor becomes expensive.

There is known an ultrasonic motor comprising a Langevin type vibrator having two ring type piezoelectric vibrators put between two metal blocks. In this ultrasonic motor, a twisting joint body is connected to the end of the one metal block by a bolt for fixing the metal blocks and the piezoelectric vibrators and a rotary member is pressed on the twisting joint body by a spring.

However, the composition of the ultrasonic motor is complex and its cost becomes expensive.

SUMMARY OF THE INVENTION

It is, therefore, the primary object of the present invention to provide an ultrasonic driving device having a simple composition.

It is another object of the present invention to provide an ultrasonic driving device having two divided electrodes for driving a member to be driven one way or the other way.

It is another object of the present invention to provide an ultrasonic driving device for driving a member to be driven by a rotary progression wave generating on end and side portions according to the expansion and contraction of a piezoelectric vibrator or vibrators.

In order to accomplish the above and other objects, the present invention provides a stator comprising two metal blocks, a piezoelectric vibrator or vibrators and two electrodes, one electrode being divided in two at least, which are put between two metal blocks, and a bolt for fixing the metal blocks, the piezoelectric vibrator or vibrators and two electrodes by means of threads on both sides of the metal blocks, and a member to be driven composed on the end or side portion of the stator.

BRIEF DESCRIPTION OF THE DRAWINGS

FIGS. 15 (a) shows a side view of stator in FIG. 13. FIGS. 15 (b) shows wave form of longitudinal vibration. FIGS. 15 (c) shows wave form of torsional vibration.

DESCRIPTION OF THE PREFERRED EMBODIMENTS

Figure 1:
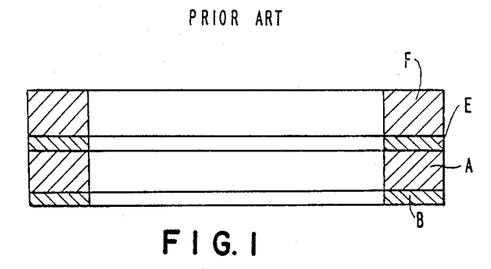
FIG. 1 shows a sectional view of an ultrasonic motor in the prior art.
Figure 2:
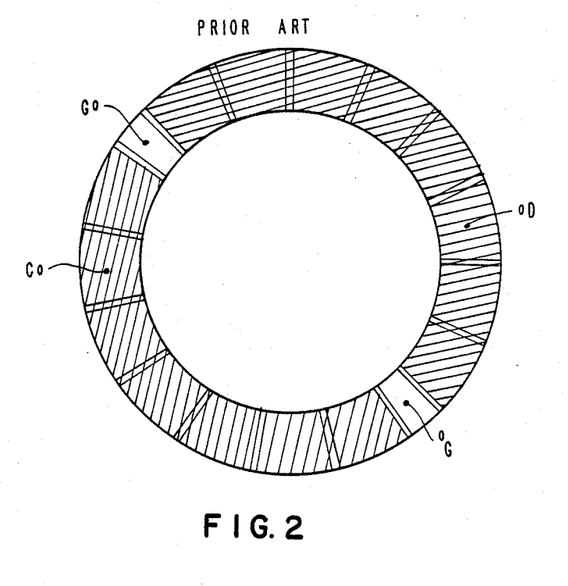
FIG. 2 shows a plane view of a form of a piezoelectric vibrator and a composition of electrodes of the piezoelectric vibrator in the ultrasonic motor in FIG. 1.

Referring to the prior art in FIG. 1, a ring type piezoelectric vibrator B is attached to a ring type resilient member A and the piezoelectric vibrator B vibrates with the resilient member. The piezoelectric vibrator B is divided in 17 parts by the ratio of e.g. 22.5° or 11.25°. The respective neighbouring portions in the 17 parts of the piezoelectric vibrator B are polarized by the reverse polarity to each other as shown in FIG. 2. The two portions C and D in the one side of the piezoelectric vibrator B are respectively attached as an electrode by conductive paint as shown in FIG. 2. The portion G in FIG. 2 shows an earth electrode. The member F to be driven to which slider E is attached is mounted on the resilient member A.

In the ultrasonic motor in the prior art, the alternating current of $V_o \sin\omega t$ is applied to the one electrode C and the alternating current $V_o \cos\omega t$ is applied to the other electrode D, where $V_o$ is instantaneous value, $\omega$ is radian frequency and t is time. The phases of these voltages shift by $\pi/2$ to each other. Thereby, the divided portions of the piezoelectric vibrator B alternately expand and contract and thus, the resilient member A has a bending vibration. Therefore, a standing wave is generated in the resilient member A and a progressive wave is generated on the resilient member A. Thus, the driven member F having the slider E is rotated on the resilient member A.

However, in the prior ultrasonic motor, because the divided portions of the ring type piezoelectric vibrator B must be alternately polarized and the divided electrodes must be formed on the divided portion of the piezoelectric vibrator B, the composition of the prior ultrasonic motor is complex.

Figures 3, 4:
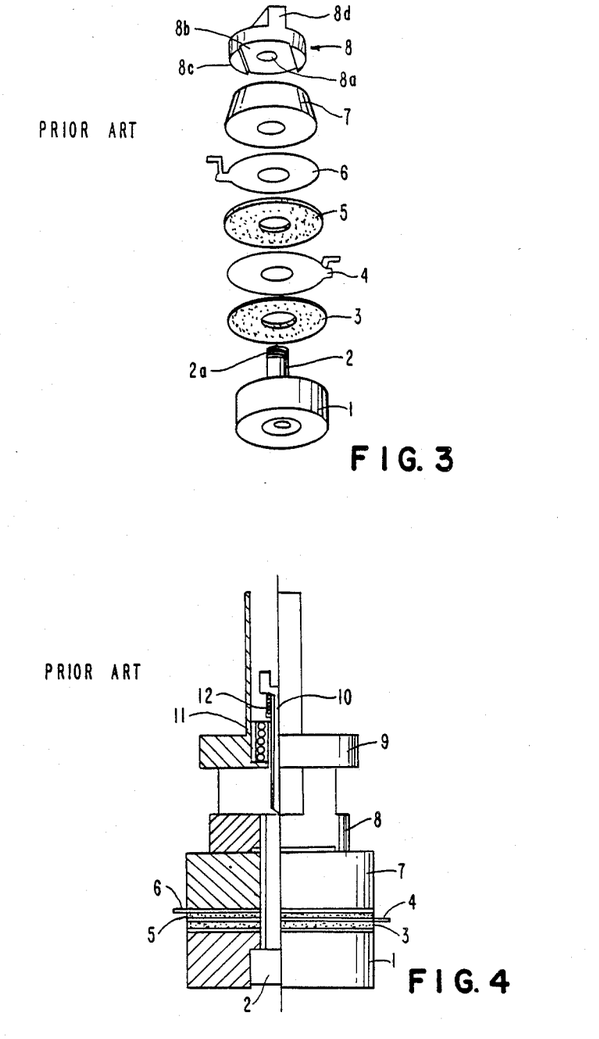
FIG. 3 shows a separated perspective view of the stator of an ultrasonic motor in the other prior art.
FIG. 4 shows a side view having a partial sectional view of an ultrasonic motor in the prior art of FIG. 3.

Referring to the prior art in FIG. 3, a piezoelectric vibrator 3, a terminal plate 4, a piezoelectric vibrator 5, a terminal plate 6 and an aluminum disk 7 are put on a washer 1 and a bolt 2 is inserted to the center holes of these members. The screw threads 2a of the bolt 2 are engaged with the screw hole 8a of a twisting joint body 8. A drain 8b is formed on the under surface of the twisting joint body 8, arcuate projections 8c are formed in both sides of drain 8b and a beam 8d is so formed in the upper portion of the twisting joint body 8 so that an angle between the beam 8d and drain 8b becomes a predetermined value.

In this prior ultrasonic driving device, when alternating current is applied through the terminal plates 4 and 6 to the piezoelectric vibrators 3 and 5 and the piezoelectric vibrators 3 and 5 are vibrated in the direction of their thickness, the arcuate projections 8c of the twisting joint body 8 are pushed and twisted by the vibration of the piezoelectric vibrators 3 and 5. Therefore, the twisting joint body 8 is vibrated to be twisted. When the excitation frequency of the alternating current voltage approaches a resonance frequency, elliptic vibration arises on the beam 8d of the twisting joint body 8.

Therefore, as shown in FIG. 4, a rotary member 9 is put on the twisting joint body 8, a center bolt 10 passed through a bearing 11 of the rotary member 9 fixes the twisting joint body 8, and a spring 12 is attached between the upper end of the bolt 10 and the bearing 11, whereby the rotary member 9 is strongly touched on the beam 8d of the twisting joint body 8 and is rotated by the elliptic vibration on the beam 8d.

However, in the prior ultrasonic motor, the composition of the twisting joint body 8 is complex and strong torque cannot be obtained by the composition of the ultrasonic motor.

Figures 5, 6:
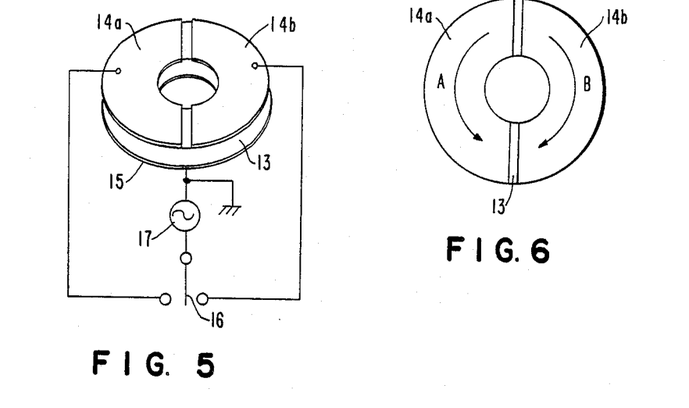
FIG. 5 shows a perspective view of a piezoelectric vibrator and electrodes according to the present invention.
FIG. 6 shows a plane view of a piezoelectric vibrator and electrodes in FIG. 5.

Referring to FIG. 5, a ring type piezoelectric vibrator 13 of piezoelectric ceramics and so on is put between a pair of electrodes 14a and 14b divided in two and an electrode 15. The points of contact of a switch 16 are connected to the electrodes 14a and 14b and the movable contact of switch 16 is connected to one terminal of alternating current power supply 17 and the other terminal of the alternating current power supply 17 is connected to the electrode 15 with ground.

When the switch 16 is connected to the electrode 14a and alternating current is applied from the alternating current power supply 17 to the electrode 14a, a progressive wave as shown by the arrow A generates in the end portion and side portion of the piezoelectric vibrator 13. Also, when the switch 16 is connected to the electrode 14a, a progressive wave as shown by the arrow B generates in the end portion and side portion of the piezoelectric vibrator 13.

Explaining the principle for generating the progressive wave in the piezoelectric vibrator 13, when one side portion of the piezoelectric vibrator 13 is driven by supplying the voltage, a voltage is generated in the other side portion of the piezoelectric vibrator 13 causing expansion and contraction in the one side portion of the piezoelectric vibrator 13. The phase of the voltage generated in the other side portion is later than that of the voltage supplied to the one side portion. Therefore, the expansion and contraction are partly generated in the piezoelectric vibrator 13 and the progressive waves in the direction of arrows A and B are generated in the end portion and side portion.

Figure 7:
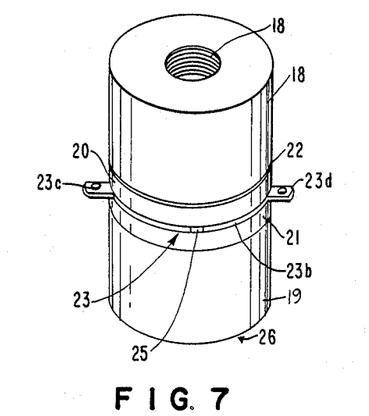
FIG. 7 shows a perspective view of a stator according to the present invention.
Figure 8:
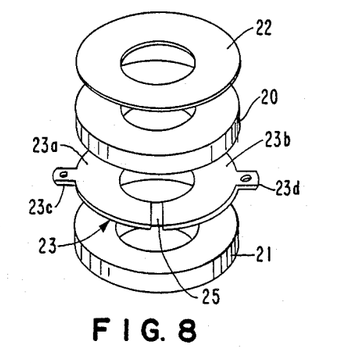
FIG. 8 shows a separated perspective view of piezoelectric vibrators and electrodes of the stator in FIG. 7.
Figure 9:
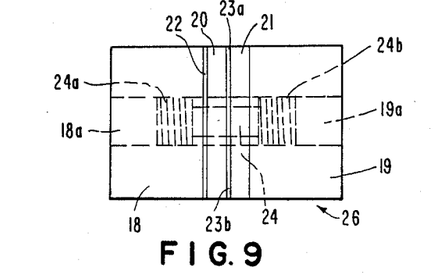
FIG. 9 shows a side view of the stator in FIG. 7.

Referring to FIG. 7, FIG. 8 and FIG. 9, piezoelectric vibrators 20 and 21 of a ceramics vibrator and so on are put between two metal blocks 18 and 19, electrodes 22 and 23 are put between the metal block 18 and the piezoelectric vibrator 20 and the piezoelectric vibrators 20 and 21, and a bolt 24 is passed through the center holes of the piezoelectric vibrators 20 and 21 and the electrodes 22 and 23 and both screw sides 24a and 24b of the bolt 24 are inserted into the threads 18a and 19a of the metal blocks 18 and 19, and the metal blocks 18 and 19 are thereby fixed. The electrode 23 between the piezoelectric vibrators 20 and 21 is divided in two and a gap 25 is formed between these divided electrodes 23a and 23b. A stator 26 is formed by this composition.

In the ultrasonic driving device of this embodiment, when the alternating current is applied to one of the terminals 23c and 23d and the electrode 22, one side portion of the piezoelectric vibrators 20 and 21 vibrates in its thickness direction and vibrates in its radial direction according to the thickness direction. When torsional vibration generated according to the longitude-directional vibration and the radial-directional vibration is transmitted to the two metal blocks 18 and 19, the progressive wave generates in the end portion and the side portion of the stator 26. A member to be driven at the end portion and side portion of the stator 26 is driven by the progressive wave.

Figure 10:
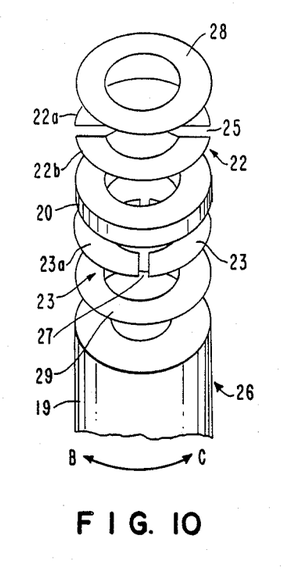
FIG. 10 shows a separated perspective view of one portion of a stator in another embodiment according to the present invention.

Referring to FIG. 10, a stator 26 having one piezoelectric vibrator 20 and electrodes 22 and 23 divided in two and gaps 25 and 27 between the respective divided electrodes 22a and 22b and 23a and 23b of the electrodes 22 and 23 are shifted by 90° to each other. Insulation members 28 and 29 are put between the electrodes 22 and 23 and the metal blocks 18 and 19 and are protected from electric conduction.

Figure 11:
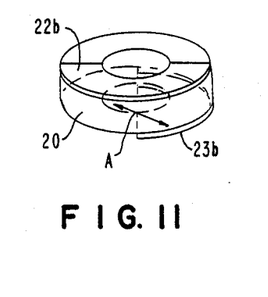
FIG. 11 shows a perspective view of a piezoelectric vibrator and electrodes for explaining a principle of the generation of rotative vibration in the stator in FIG. 10.

In the ultrasonic driving device composed as above, when the alternating current is applied to the electrodes 22b and 23b, the alternating current is obliquely applied to the piezoelectric vibrator 20 as shown by arrow A of FIG. 11, the piezoelectric vibrator 20 generates torsional vibration by the thickness vibration and the radial vibration and the torsional vibration are amplified by the metal blocks 18 and 19. When the alternating current is applied between the electrodes 22b and 23b, compound vibration of the longitudinal vibration and torsional vibration is generated by the torsional vibration of the arrow A in FIG. 11 and the progressive wave (the arrow B of FIG. 10) is generated in the end portion and the side portion of the stator 26 by the compound vibration. When the alternating current is applied to the electrodes 22a and 23b, the progressive wave generates in the direction of the arrow B in FIG. 10. When the alternating current voltage is applied to the electrodes 22a and 23a, the progressive wave generates in the direction of the arrow C in FIG. 10. When the alternating current voltage is applied to the electrodes 22b and 23a, the progressive wave generates in the direction of the arrow B in FIG. 10.

When the member to be driven is composed with the stator 26, the member is rotated.

Figure 12:
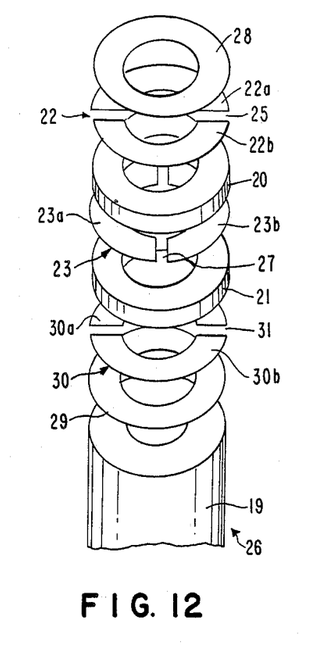
FIG. 12 shows a separated perspective view of one portion of a stator in another embodiment according to the present invention.

Referring to FIG. 12, two piezoelectric vibrators 20 and 21 are put between the electrodes 22, 23 and 24 respectively and the electrodes 22, 23 and 30 are respectively divided in two. The gap 25 between the electrode 22a and 22b is shifted by 90° to the gap 27 between the electrodes 23a and 23b. The gap 31 between the electrodes 30a and 30b is formed in the same direction of the gap 25 of the electrodes 22a and 22b. Insulation members 28 and 29 are put between the electrode 22 and the metal block 18 and the electrode 30 and the metal block 19.

In the embodiment composed as shown above, the progressive wave generated by applying the alternating current voltage to the electrodes 22a, 30a and 23a is reversed to that generated by applying the alternating current voltage to the electrodes 22a, 30a and 23b. The progressive wave generated by applying the alternating current to the electrodes 22b, 30b and 23a is reversed to that generated by applying the alternative current voltage to the electrodes 22b, 30b and 23b.

In the above embodiment, the gap 25 between the electrodes 22a and 22b, the gap 27 between the electrodes 23a and 23b and the gap 31 between the electrodes 30a and 30b are shifted by 90° to each other, but the shifts between the gaps 25, 27 and 28 may be less than 90°. In the above embodiment, though the metal blocks 18 and 19 are the same as each other, the metal blocks 18 and 19 may be asymmetric to each other.

Figures 13, 14:
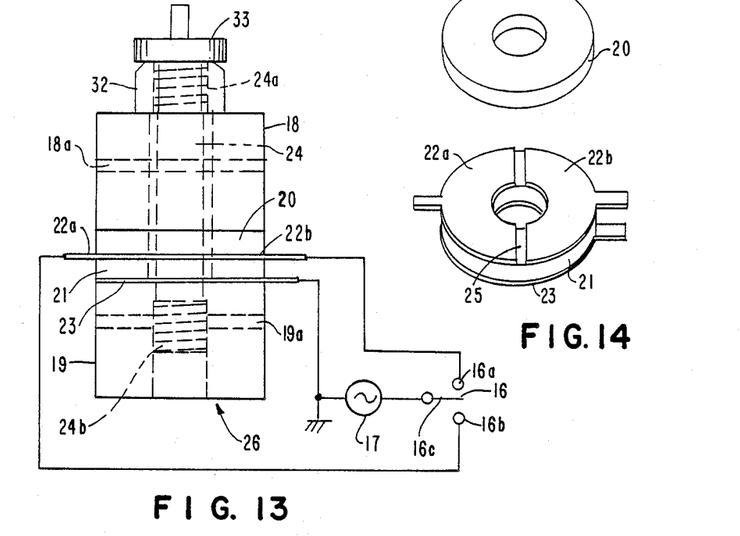
FIG. 13 shows a side view of an ultrasonic driving device according to the present invention.
FIG. 14 a perspective view of piezoelectric vibrators and electrodes of the stator in FIG. 13.

Referring to FIG. 13, an ultrasonic driving device according to the present invention comprises metal blocks 18 and 19, two piezoelectric vibrators 20 and 21 and divided electrodes 22a and 22b (see FIG. 14) and electrode 23. The male screw threads 24b of the bolt 24 are engaged with the female threads of the metal block 19. The bolt 24 is passed through the center holes of the piezoelectric vibrator 20 and 21, the electrode 23 and metal block 18 and the male screw threads 24a of the bolt 24 are engaged by a nut 32, whereby a stator 26 is composed. The divided electrodes 22a and 22b are connected to the contacts 16b and 16a and the alternating current supply 17 is connected between the movable contact of the switch 16 and the electrode 23 connected to the ground.

In the embodiment, when the alternating current is applied to the divided electrode 22a and the electrode 23 by connecting the movable contact 16c to the contact 16b, the progressive wave arises on the end and side portions of the metal blocks 18 and 19, the end and side portions of the nut 32 and the side portions of the piezoelectric vibrators 20 and 21 as shown by the arrow A. When the alternating current is applied to the divided electrode 22b and the electrode 23 by connecting the movable contact 16c to the contact 16a, the progressive wave arises on the end and side portions of the metal blocks 18 and 19, the end and side portions of the nut 32, and the side portions of the piezoelectric vibrators 20 and 21 as shown by the arrow B. Therefore, a member 33 to be driven which is pressed to the nut 32 is rotated in the direction of the arrow B.

In the stator 26, dead zones in which torsional vibration does not arise are provided about center portions 18a and 19a of the metal blocks 18 and 19.

In the above embodiment, when the movable contact 16c of the switch 16 is connected to the contact 16b or 16a, the member 33 is rotated in the direction of the arrow A or B with a strong torque.

Figure 15:
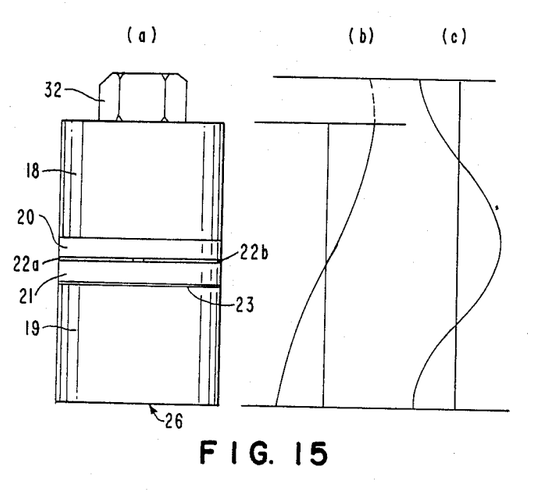

Explaining the drive principle of this embodiment, when the whole length of the metal blocks 18 and 19 and the piezoelectric vibrators 20 and 21 in the stator 26 as shown in FIG. 15(a) is identical with a half wave of the resonance frequency of the longitudinal vibration due to the longitudinal vibration of the piezoelectric vibrators 20 and 21 as shown in FIG. 15(b) and also, the whole length of the stator 26 between the end face of the nut 32 and the end face of the metal block 19 is identical with one wave of the resonance frequency of the torsional vibration of the piezoelectric vibrators 20 and 21 as shown in FIG. 15(c), a strong progressive wave arises on the end portion of the nut 32 and the metal blocks 18 and 19 due to the compound vibration of the longitudinal vibration and the torsional vibration. Therefore, the member 33 to be driven is pressed on the stator 26 and is rotated strongly.

Figure 16:
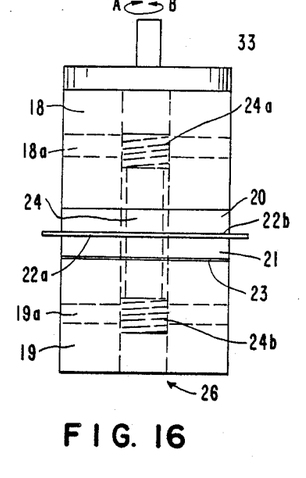
FIG. 16 shows a side view of ultrasonic driving device of another embodiment in the present invention.

Referring to FIG. 16, in the ultrasonic driving device of the embodiment according to the above principle, the whole length of the metal blocks 18 and 19 and the piezoelectric vibrators 20 and 21 is identical with one wave of the longitudinal vibration, the male screw threads 24a and 24b of the bolt 24 are put on the dead zones 18a and 19a of the metal blocks 18 and 19 respectively, the divided electrodes 22a and 22b are put between the piezoelectric vibrators 20 and 21 and the electrode 23 is put between the piezoelectric vibrator 21 and the metal block 19. When the alternating current is applied to each of the divided electrodes 22a and 22b, the rotary progression wave arises on the end portions of the metal blocks 18 and 19 and the side portions of the piezoelectric vibrators 20 and 21.

Therefore, when the member 33 to be driven is pressed on the portion in which the torsional vibration arises such as the end portion of the metal block 18 and the alternating current is applied to each of the divided electrodes 22a and 22b, the member 33 is strongly rotated in the direction A or B.

Figure 17:
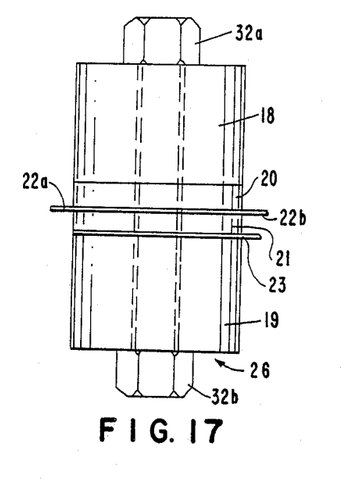
FIG. 17 shows a side view of a stator of another embodiment in the present invention.

Referring to FIG. 17, in a stator of an ultrasonic driving device of another embodiment, the bolt 24 is passed through holes of the metal blocks 18 and 19, the piezoelectric vibrators 20 and 21, the divided electrodes 22a and 22b and electrode 23 and the threads of both ends of the bolt 24 are engaged with the nuts 32a and 32b, whereby the stator 26 is composed. The whole length of the metal blocks 18 and 19 and the piezoelectric vibrators 20 and 21 is identical with one wave of the resonant frequency of longitudinal vibration.

In the stator in this embodiment, the progressive wave arises on the end and side portions of the metal blocks 18 and 19, the side portions of the piezoelectric vibrators 20 and 21 and the end and side portions of the nuts 32a and 32b, and the member to be driven is rotated in a reversible direction by applying the alternating current to the divided electrode 22a or 22b.

Figures 18, 19:
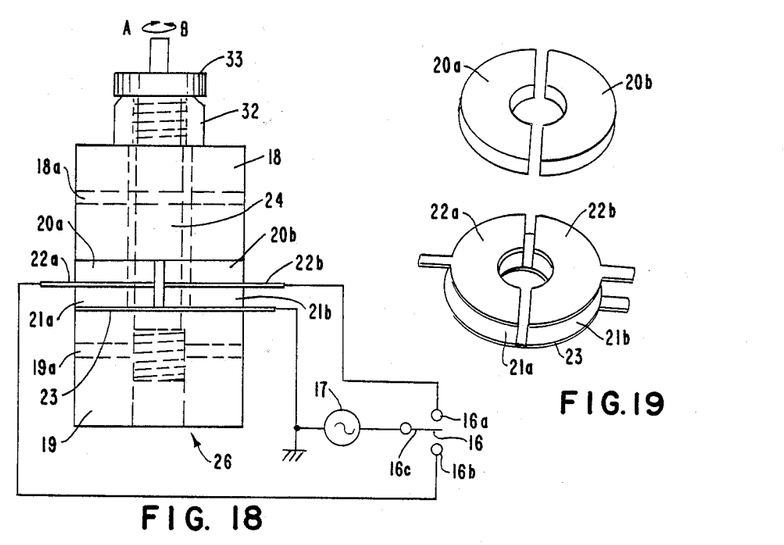
FIG. 18 shows a side view of an ultrasonic driving device of another embodiment in the present invention.
FIG. 19 shows a perspective view of piezoelectric vibrators and electrodes of the stator in FIG. 18.

Referring to FIG. 18, 16 designates a switch, 17 an alternating current supply 18 and 19 metal blocks, 23 an electrode, 24 a bolt, 32 a nut, and 33 a member to be driven, and these elements are same as those of the ultrasonic driving device in FIG. 13. In this embodiment, piezoelectric vibrators 20 and 21 are respectively divided in two as shown by 20a, 20b, 21a and 21b in FIG. 19 and an electrode is divided in two by 22a and 22b.

In this ultrasonic driving device, the reversible progressive wave due to the torsional vibration arises on the end and side portions of the stator 26 by connecting the movable contact 16a to the contact point 16a or 16b.

Figure 20:
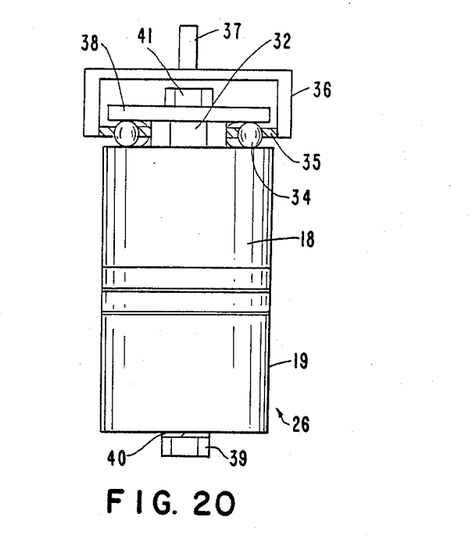
FIG. 20 shows a side view of an ultrasonic driving device of another embodiment of the present invention.

In FIG. 20, a plurality of balls 34 carried with a rotary disk 35 are put on the stator 26 as shown in FIG. 13 or FIG. 18, a rotary axis is provided with an arm 36 attached to the side of the disk 35 and the balls 34 are pressed by a supporting disk 38. A bolt 39 is passed through the holes of a spring washer 40 and the bolt 24 and is engaged with a nut 41 and the disk 38 is fixed on the nut 32 by nut 41.

In this embodiment, the balls 34 are rotated by the progressive wave on the end portion of the metal block 18, whereby the rotary disk 35 is rotated in a reverse direction by applying the alternating current to the divided electrode 22a or 22b and the rotary axis 37 is rotated in the reverse direction. Therefore, this ultrasonic driving device can be used as an electric motor.

Figure 21:
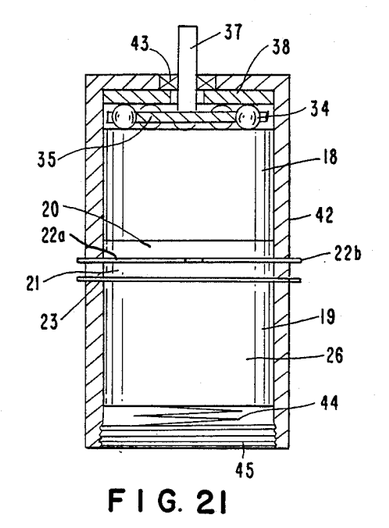
FIG. 21 shows a side view of an ultrasonic driving device of another embodiment of the present invention.

In the embodiment of FIG. 21, a rotary axis 37 is fixed with a rotary disk 35 supporting a plurality of balls 34, and is passed through the hole of a supporting disk 38 in a case 42 and is supported by a bearing 43 provided with the end protion of the case 42. The balls 34 are strongly contacted with the stator 26 by a spring 44 which is supported by a cap 45 engaged with the end of the case 42.

In this stator 26, the piezoelectric vibrator 20, the divided electrodes 22a and 22b and the electrode 23 are put between the metal blocks 18 and 19 and are respectively attached with each other by adhesive.

In this embodiment, when the alternating current is applied to each of the divided electrodes 22a and 22b, the reverse progression wave arises on the end and side portions of the stator 26 and the rotary disk 35 and the rotary axis 37 are rotated in reverse directions by the progressive wave. Therefore, the ultrasonic driving device can be used as an electric motor.

In the ultrasonic driving device of the above embodiment, the stator may use that of FIG. 7.

What is claimed is:

1. An ultrasonic driving device comprising:
   a stator having two metal blocks,
   at least one piezoelectric vibrator,
   two electrodes, one electrode being divided in two parts,
   said electrodes and said at least one vibrator being positioned between said two metal blocks,
   a bolt for fixing the metal blocks, the at least one piezoelectric vibrator and said two electrodes by means of threads on said bolt extending to both sides of the metal blocks,
   a member to be driven on an end portion or side portion of the stator, and
   a single AC voltage supply means for driving only one said part of said divided electrode, said AC voltage supply means supplying an AC voltage only to said one said part and to the other electrode.

2. An ultrasonic driving device as set forth in claim 1, wherein the combined length of the two metal blocks, the at least one piezoelectric vibrator and the two electrodes is identical with one wave of the resonant frequency of longitudinal vibration.

3. An ultrasonic driving device as set forth in claim 1, wherein the member includes a plurality of balls, a disk supporting the balls, an arm fixed with a side portion of the disk and a rotary axis fixed with the arm, and the balls are pressed on the end portion of the stator by a supporting disk.

4. An ultrasonic driving device as set forth in claim 1, wherein the member includes a plurality of balls, a disk supporting the balls and a rotary axis fixed with the disk and supported by a bearing of a case, and the balls are pressed into the case by a supporting disk and spring at the end portion of the stator.

5. An ultrasonic driving device as set forth in claim 1, wherein at least one said piezoelectric vibrator is divided in two parts.

6. An ultrasonic driving device comprising:
   a stator having two metal blocks
   at least one piezoelectric vibrator,
   two electrodes, one electrode being divided in two parts, said electrodes and said at least one vibrator being positioned between said two metal blocks,
   a bolt for fixing the metal blocks, the at least one piezoelectric vibrator and the two electrodes by means of a nut and screw threads on one side of the metal blocks,
   a member to be driven composed on the nut or an end or side portion of the stator, and
   a single AC voltage supply means for driving only one said part of said divided electrode, said AC voltage supply means supplying an AC voltage only to said one said part and to the other electrode.

7. An ultrasonic driving device as set forth in claim 6, wherein the combined length of the metal blocks, the at least one piezoelectric vibrator and the two electrodes is identical with a half wave of the resonant frequency of longitudinal vibration and the combined length of end surfaces, the nut and one side of the metal block is identical with one wave of the resonant frequency of torsional vibration.

8. An ultrasonic driving device as set forth in claim 6, wherein the member includes a plurality of balls, a disk supporting the balls, an arm fixed with a side portion of the disk and a rotary axis fixed with the arm, and the balls are pressed on the end portion of the stator by a supporting disk.

9. An ultrasonic driving device as set forth in claim 6, wherein the member includes a plurality of balls, a disk supporting the balls and a rotary axis fixed with the disk and supported by a bearing of a case, and the balls are pressed into the case by a supporting disk and spring at the end portion of the stator.

10. An ultrasonic driving device as set forth in claim 6, wherein at least one said piezoelectric vibrator is divided in two parts.

11. An ultrasonic driving device comprising:
    a stator having two metal blocks,
    at least one piezoelectric vibrator,
    two electrodes, one electrode being divided in two parts said electrodes and said at least one vibrator being positioned between said two metal blocks,
    a bolt for fixing the metal blocks, the at least one piezoelectric vibrator and the two electrodes by means of screw threads at both sides of the bolt and two nuts secured thereon, a member to be driven on an end portion or side portion of the stator, and a single AC voltage supply means for driving only one said part of said divided electrode, said AC voltage supply means supplying an AC voltage to said one said part and to the other electrode.

12. An ultrasonic driving device as set forth in claim 11 wherein the combined length of the metal blocks, the at least one piezoelectric vibrator and the two electrodes is identical with a half wave of the resonant frequency of longitudinal vibration and the combined length between end surfaces of the device and of the two nuts is identical with one wave of the resonant frequency of torsional vibration.

13. An ultrasonic driving device as set forth in claim 11, wherein the member includes a plurality of balls, a disk supporting the balls, an arm fixed with a side portion of the disk and a rotary axis fixed with the arm, and the balls are pressed on the end portion of the stator by a supporting disk.

14. An ultrasonic driving device as set forth in claim 11, wherein the member includes a plurality of balls, a disk supporting the balls and a rotary axis fixed with the disk and supported by a bearing of a case, and the balls are pressed into the case by a supporting disk and spring at the end portion of the stator into the case.

15. An ultrasonic driving device as set forth in claim 11, wherein at least one said piezoelectric vibrator is divided in two parts.

16. An ultrasonic driving device comprising:

a stator having two metal blocks, at least one piezoelectric vibrator, two electrodes, one electrode being divided in two parts, said electrodes and said at least one vibrator being positioned between said two blocks, a bolt for fixing the metal blocks, the at least one piezoelectric vibrator and the two electrodes by means of a nut and a screw at one side of the metal blocks, a member to be driven including a plurality of balls, a disk supporting the balls, an arm fixed with a side portion of the disk and a rotary axis fixed with the arm, and a supporting disk fixed on an end portion of the nut by means of a small bolt and a nut, the balls of the member being pressed on an end portion of the device by the supporting disk, and a single AC voltage supply means for driving only one said part of said divided electrode, said AC voltage supply means supplying an AC voltage only to said one said part and to the other electrode.

17. An ultrasonic driving device comprising:

a case, a stator having two metal blocks, at least one piezoelectric vibrator, two electrodes, one electrode being divided in two parts, said electrodes and said at least one vibrator being positioned between the two metal blocks, a bolt for fixing the metal blocks, the at least one piezoelectric vibrator and the two electrodes by means of screw threads at both sides of the metal blocks, a member to be driven including a plurality of balls, a disk supporting the balls and a rotary axis fixed with the disk and supported by a bearing of the case, the balls being pressed into the case by a supporting disk and spring at an end portion of the stator, and a single AC voltage supply means for driving only one said part of said divided electrode, said AC voltage supply means supplying an AC voltage only to said one said part and to the other electrode.

18. An ultrasonic driving device comprising:

a case, a stator having two metal blocks, at least one piezoelectric vibrator, two electrodes, one electrode being divided in two parts, said electrodes and said at least one vibrator being positioned between the two metal blocks, adhesive means for fixing the metal blocks, the at least one piezoelectric vibrator and the two electrodes, a member to be driven including a plurality of balls, a disk supporting the balls and a rotary axis fixed with the disk and supported by a bearing of the case, the balls being pressed into the case by a supporting disk and spring at an end portion of the stator, and a single AC voltage supply means for driving only one said part of said divided electrode, said AC voltage supply means supplying an AC voltage only to said one said part and to the other electrode.

19. An ultrasonic driving device as set forth in claim 1, further including switch means for selectively supplying the AC voltage from said AC voltage supply means selectively supplying the AC voltage to either one of said parts of said divided electrode and preventing the supply of said AC voltage to the other non-selected part of said divided electrode.

20. An ultrasonic driving device as set forth in claim 6, further including switch means for selectively supplying the AC voltage from said AC voltage supply means either one of said parts of said divided electrode and preventing the supply of said AC voltage to the other non-selected part of said divided electrode.

21. An ultrasonic driving device as set forth in claim 11, further including switch means for selectively supplying the AC voltage from said AC voltage supply means to either one of said parts of said divided electrode and preventing the supply of said AC voltage to the other non-selected part of said divided electrode.

22. An ultrasonic driving device as set forth in claim 16, further including switch means for selectively supplying the AC voltage from said AC voltage supply means to either one of said parts of said divided electrode and preventing the supply of said AC voltage to the other non-selected part of said divided electrode.

23. An ultrasonic driving device as set forth in claim 17, further including switch means for selectively supplying the AC voltage from said AC voltage supply means to either one of said parts of said divided electrode and preventing the supply of said AC voltage to the other non-selected part of said divided electrode.

24. An ultrasonic driving device as set forth in claim 18, further including switch means for selectively supplying the AC voltage from said AC voltage supply means to either one of said parts of said divided electrode and preventing the supply of said AC voltage to the other non-selected part of said divided electrode.

* * * * *